L. W. CHUBB.
ELECTROLYTIC APPARATUS.
APPLICATION FILED APR. 27, 1917.
1,324,797.
Patented Dec. 16, 1919.
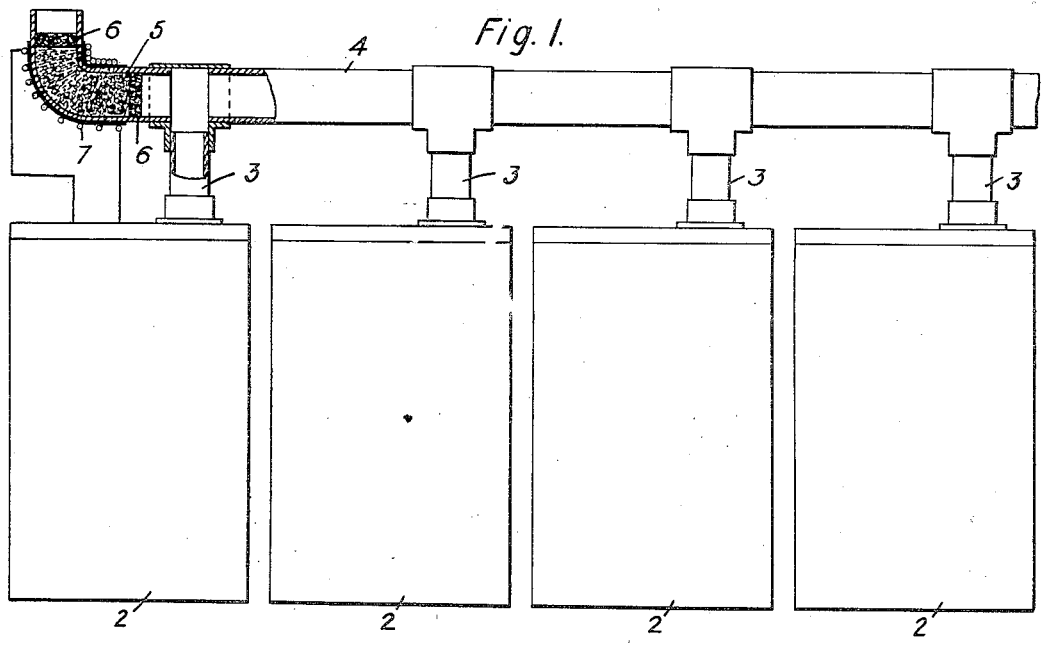
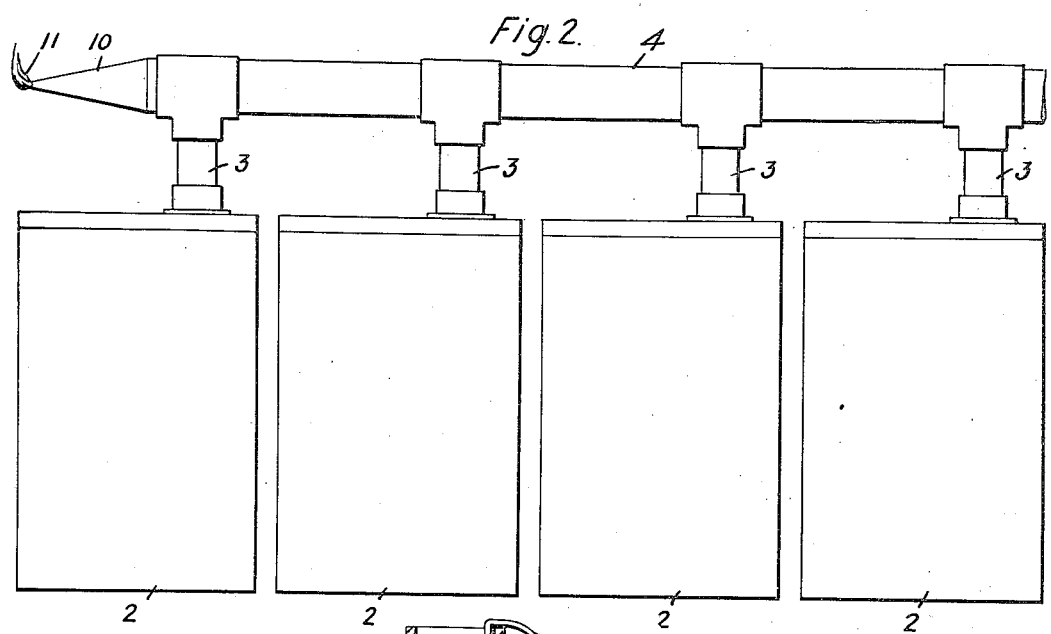
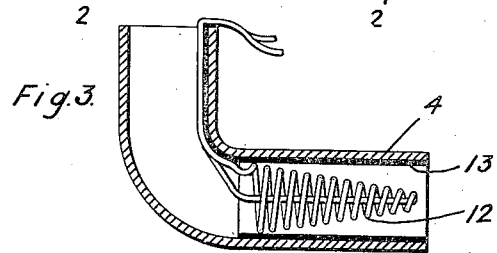
WITNESSES:
Fred H Miller
R. D. Brown
INVENTOR
Lewis W. Chubb
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTROLYTIC APPARATUS.

1,324,797.  Specification of Letters Patent.  Patented Dec. 16, 1919.

Application filed April 27, 1917. Serial No. 164,960.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrolytic Apparatus, of which the following is a specification.

My invention relates to electrolytic apparatus such as storage batteries and other cells which evolve gases during their operation, and it has for one of its objects to provide a method of preventing explosions and other harmful effects which frequently result from the evolution of gases from cells of the character indicated.

Another object of my invention is to provide apparatus for collecting the explosive or poisonous gases evolved from electrolytic cells and consuming such gases before they are permitted to escape into the surrounding atmosphere.

Storage batteries of the types commonly employed for industrial purposes give off hydrogen and other explosive gases, which frequently accumulate and cause explosions when the batteries are operated in confined places. For this reason, the usefulness of storage batteries is limited to places where sufficient ventilation is obtainable to disperse the evolved gases without explosion. It is found, for example, that when lead batteries or Edison cells are operated with inboard ventilation in submarine vessels and torpedo boats where the space is limited and the outboard ventilation insufficient, the evolved gases constitute a serious danger and have frequently resulted in explosions. Such explosions occur in submarines which have been submerged for considerable periods of time or when part of the battery is run down and reversed, or overcharged while the vessel is running on the surface.

According to my present invention, I destroy or burn the gases as rapidly as they are evolved from the cells, the gases being consumed either at each cell of a battery or at a single point to which the gases may be led through suitable pipes leading from each battery into a header or manifold pipe which may be equipped in any one of a considerable number of ways so as to oxidize the gas before it is released into the atmosphere.

The accompanying drawing illustrates diagrammatically three methods of applying my invention to a battery consisting of four cells. Figure 1 of the drawing is a diagrammatic side elevational view, partially in section, showing an arrangement in which the gases from the cells are collected in a manifold and directed upon a mass of catalytic material, the collecting pipes and the consuming device being enlarged for the sake of clearness. Fig. 2 shows an arrangement of cells which is similar to that shown in Fig. 1, but in which the gases from the battery, together with additional inflammable gas, are burnt in a flame which serves to consume the gases, and Fig. 3 is a fragmentary sectional view illustrating a method of consuming battery gases by means of incandescent wires or other solid bodies.

The battery shown in Fig. 1 consists of four cells 2, each of which communicates through a short pipe 3 with a header or manifold pipe 4. Near one end of the manifold pipe 4, I provide a mass of catalytic material 5 which may variously consist of platinum black, platinized asbestos, palladium black or any other suitable oxidizing catalyst. The catalytic material is carried upon any suitable base or carrier such as asbestos fibers, which are preferably inclosed between pieces of wire gauze or other pervious barriers 6 that serve to hold the catalytic material in place and to prevent the flame from striking back into the head of the battery from the point of combustion. In order to insure the proper operation of the catalytic material, a heating coil 7 is preferably disposed around the pipe 4 and connected across one of the battery cells or to some other convenient source of electric energy.

When the cells 2 are of such a nature that both oxygen and hydrogen are given off in about the proportions necessary for the formation of water, it is necessary to dilute the evolved gases, suitably with air, before directing the gases upon the catalytic material, since otherwise explosions may result. For this purpose, air may be forced into the opposite end of the manifold pipe from the end in which the catalytic material is disposed. Also, if the cells do not give off sufficient oxygen for complete combustion, additional oxygen may be supplied in the same manner.

The apparatus shown in Fig. 2 differs from that shown in Fig. 1 in that the discharge end of the manifold pipe 4 is drawn into a restricted nozzle 10 from which the gases issue into a flame 11 which is produced by forcing additional combustible gas into the end of the manifold pipe 4 opposite to the nozzle 10 and igniting the gas issuing from the nozzle. The combustible gas issuing from the nozzle 10 is at once consumed in the flame 11 and prevented from accumulating and exploding in the surrounding atmosphere. If it is not practicable to supply additional combustible gas to the manifold pipe, the gases issuing from the nozzle 10 may be directed into the flame of a lamp, gas burner or the like.

Fig. 3 illustrates a further modification of my invention which consists in forcing the gases evolved from the battery, preferably with the addition of air forced through the manifold pipe as in the apparatus of Fig. 1, into contact with a mass of incandescent material which raises the temperature of the gas to the ignition point. As shown in Fig. 3, the incandescent body is composed of a coil 12 of refractory resistance wire such as is employed in electrical heating apparatus, this coil being separated from the pipe 4 by means of an insulating lining 13 or otherwise and being energized from the batteries or from any other suitable source of electric energy. The same result may be obtained by providing a mass of fragments of fire clay, magnesia or other refractory substance which may be heated by means of an external heating coil such as that shown in Fig. 1 or in any other suitable manner.

Other electrical means may be provided, if desired, for consuming the combustible gases collected in the manifold pipe 4, such means consisting of a glow discharge arrangement or an ionizer employing X-rays or radium emanations. These and many other forms of apparatus for collecting and consuming the gases evolved from the battery cells may be readily devised by persons skilled in the art, and I therefore desire that no limitations be imposed upon my present invention except such as are indicated in the appended claims.

I claim as my invention:

1. The method of preventing explosions and other harmful effects resulting from the evolution of gas from electro-chemical apparatus that comprises mixing a combustion-supporting gas with the gas evolved from the apparatus and chemically consuming the mixed gases before they can escape into the air.

2. Electrolytic apparatus comprising a plurality of cells adapted to give off combustible gas during their operation, a manifold conduit communicating with the interior of each of the cells, means for supplying air to the manifold conduit, and means in communication with the manifold conduit for burning the gases and air collected in the said manifold conduit.

In testimony whereof I have hereunto subscribed my name this 26th day of April, 1917.

LEWIS W. CHUBB.